(12) United States Patent
Kim et al.

(10) Patent No.: US 8,137,595 B2
(45) Date of Patent: Mar. 20, 2012

(54) UV CURABLE PHOTOCHROMIC COMPOSITION AND PRODUCTS FORMED BY USING THE SAME

(75) Inventors: Jee-Seon Kim, Seoul (KR); Hye-Min Kim, Daejeon Metropolitan (KR); Ja-Young Han, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/738,507

(22) PCT Filed: Oct. 9, 2008

(86) PCT No.: PCT/KR2008/005937
§ 371 (c)(1),
(2), (4) Date: Apr. 16, 2010

(87) PCT Pub. No.: WO2009/051370
PCT Pub. Date: Apr. 23, 2009

(65) Prior Publication Data
US 2010/0213422 A1    Aug. 26, 2010

(30) Foreign Application Priority Data

Oct. 18, 2007   (KR) .......................... 10-2007-0105271

(51) Int. Cl.
*G02B 5/23*       (2006.01)
*C08G 18/10*     (2006.01)

(52) U.S. Cl. .................. 252/586; 430/270.1; 430/284.1; 430/286.1; 430/287.1; 430/905; 522/95; 522/96; 528/59

(58) Field of Classification Search .................. 252/586; 528/59; 430/284.1, 286.1, 287.1, 270.1, 430/905; 522/95, 96
See application file for complete search history.

(56) References Cited

U.S. PATENT DOCUMENTS

| 5,185,234 A | 2/1993 | Nakatsukasa et al. |
| 2007/0099115 A1 * | 5/2007 | Umemoto .................. 430/270.1 |

FOREIGN PATENT DOCUMENTS

| JP | 10-312057 A | 11/1998 |
| JP | 2000-187322 A | 7/2000 |

* cited by examiner

*Primary Examiner* — Mark Kopec
*Assistant Examiner* — Bijan Ahvazi
(74) *Attorney, Agent, or Firm* — McKenna Long & Aldridge LLP

(57) ABSTRACT

The present invention relates to a UV curable photochromic composition comprising a photochromic dye and an acrylate-based prepolymer having a polyol structure in which an acrylate-based functional group is introduced by using an isocyanate-based compound having two or more isocyanate functional groups as a linker, and to products formed by using the same.

14 Claims, No Drawings

UV CURABLE PHOTOCHROMIC COMPOSITION AND PRODUCTS FORMED BY USING THE SAME

This application is a 35 U.S.C. §371 National Stage entry of International Application No. PCT/KR2008/005937, filed on Oct. 9, 2008, and claims priority to Korean Application No. 10-2007-0105271, filed on October 18, 2007, which are all hereby incorporated by reference in their entireties.

TECHNICAL FIELD

The present invention relates to a UV curable photochromic composition and products by using the same. In particular, the present invention relates to a UV curable photochromic composition, in which curing reaction easily occurs under mild UV radiation conditions, thereby increasing process efficiency, and thermal aging of photochromic dye is not generated during curing reaction, thereby improving durability, and to products by using the same. This application claims priority from Korean Patent Application No. 10-2007-0105271 filed on Oct. 18, 2007 in the Korean Intellectual Property Office, the disclosure of which is incorporated herein by reference in its entirety.

BACKGROUND ART

Photochromic substances exhibit a reversible change when exposed to light radiation involving ultraviolet rays, such as the ultraviolet radiation in sunlight or the light of a mercury lamp. Generally, photochromic substances contain acrylate monomers and photochromic dyes, in which acrylate monomers are crosslinked by UV to form a photochromic coating film.

Photochromic dyes such as spirooxazine or naphthopyran series compounds are generally used. Photochromic dyes exhibits color change depending on conformational change such as ring closing or opening reaction, which is contained in the compound. Energy source needed for conformational change of the molecules is typically ultraviolet light at a wavelength of 360 to 380 nm, even though there is a difference between specific substances.

On the other hand, to cure the photochromic compositions containing acrylate monomers, very strong ultraviolet is required. Thus, the photochromic dye contained in the photochromic composition is degraded to reduce the optical density. Ultimately, suitable photochromism is not ensured to problematically generate reduction in durability of the formed coating film.

Meanwhile, in the case of using a thermally curable urethane-based resin, such problems generated in the photocurable photochromic coating film can be avoided, but too much time is needed for curing. In order to solve the above-mentioned problems, many efforts have been made, thereby leading to the present invention.

DISCLOSURE OF INVENTION

Technical Problem

An object of the present invention is to solve the problems such as limits in photochromism acquisition or reduced durability which are generated upon forming a coating film using the conventional curable photochromic compositions and a long processing time which is needed upon forming a coating film using thermally curable photochromic compositions. Thus, it is an object of the present invention to provide a UV curable photochromic composition free of the above-described problems.

Technical Solution

In order to achieve the above-described problems, the present invention provides a UV curable photochromic composition comprising a photochromic dye and an acrylate-based prepolymer having a polyol structure in which an acrylate-based functional group is introduced by using an isocyanate-based compound having two or more isocyanate functional groups as a linker.

Further, the present invention provides photochromic products formed by using the UV curable photochromic composition.

Further, the present invention provides an acrylate-based prepolymer having a polyol structure, in which an acrylate-based functional group is introduced by using an isocyanate-based compound having two or more isocyanate functional groups as a linker.

Further, the present invention provides a method for preparing an acrylate-based prepolymer, comprising the steps of:

introducing an acrylate-based functional group into an isocyanate-based compound having two or more isocyanate functional groups; and polymerizing the compound, which has an acrylate-based functional group introduced thereto, with a polyol.

Advantageous Effects

In the case of using the conventional UV curable compositions, strong UV radiation is required. Thus, thermal aging of photochromic dye is generated, leading to reduction in the optical density and durability of photochromic products including photochromic coating films. In addition, in the case of using the conventional thermally curable compositions, a long processing time is needed for curing reaction, resulting in efficiency loss. However, in the present invention, used is an acrylate-based prepolymer having a polyol structure in which an acrylate group is introduced by using an isocyanate-based compound having two or more isocyanate functional groups as a linker. Accordingly, curing reaction easily occurs under mild UV radiation conditions, and thermal aging of photochromic dye is not generated, thereby improving durability.

BEST MODE FOR CARRYING OUT THE INVENTION

Hereinafter, the present invention will be described in detail.

The UV curable photochromic composition according to the present invention is characterized in that it comprises an acrylate-based prepolymer having a polyol structure, in which an acrylate-based functional group is introduced by using an isocyanate-based compound having two or more isocyanate functional groups as a linker.

In the present invention, an acrylate-based functional group and a polyol can be introduced into one molecule using an isocyanate-based compound having two or more isocyanate functional groups as a linker. In particular, one isocyanate group of the isocyanate-based compound binds with the acrylate-based functional group, and the other isocyanate group binds with polyol, and thus functions as a linker of the acrylate-based functional group and polyol. In the present invention, by using the acrylate-based prepolymer having the structure, curing reaction easily occurs under milder UV radiation conditions, as compared to the conventional UV curable photochromic composition.

The acrylate-based prepolymer may comprise a unit of the following Formula 1:

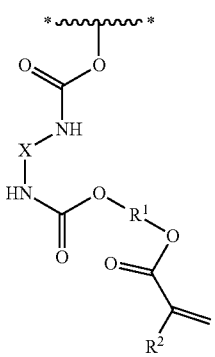

[Formula 1]

wherein

∿∿∿ is a main chain of polyol,

X is a main domain of a compound having two or more isocyanate groups, $R^1$ is a direct bond or alkylene group, and $R^2$ is hydrogen or alkyl group.

The acrylate-based prepolymer may have a weight average molecular weight of 2,000 or more, preferably 4,000 or more, and more preferably 6,000 or more. In addition, the acrylate-based prepolymer may have a weight average molecular weight in a range of 10,000 or less.

In the case of forming a film using only an acrylate monomer having a low molecular weight as in the prior art, cross linking density is increased, and high energy is needed upon crosslinking. However, since the acrylate-based prepolymer having a high molecular weight in a form of oligomer is used in the present invention, the acrylate functional groups involved in the reaction can be reduced, and thus the reaction conditions can be mildly maintained.

The acrylate-based prepolymer may be prepared by polymerizing polyol with the compound which has two or more isocyanate groups and the acrylate-based functional group introduced thereto.

Any polyol may be used without limitations, as long as it has two or more hydroxyl groups (—OH), and preferred polyol has a hydroxy value of 200 to 2,000 and a weight average molecular weight of 1,000 to 2,000. In the case where the polyol has a hydroxy value and weight average molecular weight within the above range, gelation and porosity of the prepolymer can be advantageously prevented. In particular, by suitably controlling the hydroxy value of the polyol used for the preparation of the acrylate-based prepolymer, a free volume of the prepolymer is controlled to facilitate ring-opening and closing of the photochromic dye.

In particular, the polyol is preferably a substance obtained by a method comprising the steps of:

(S21) injecting a mixture of toluene and n-butylacetate in a weight ratio of 1:1 into a reactor;

(S22) heating while injecting nitrogen ($N_2$) into the reactor;

(S23) diluting 50 to 70% by weight of a monomer mixture of hydroxy propyl methacrylate and butylacrylate in a weight ratio of 5:1 to 1:5 and 0.5 to 3% by weight of a thermal polymerization initiator in 50 to 30% by weight of toluene, and adding the resultant to the reactor; and (S24) stirring the resultant in the reactor for 1 to 5 hrs, but is not limited thereto.

In step (S23), the addition of the resultant into the reactor is preferably performed for 1 to 5 hrs under the conditions that the internal temperature of the reactor is 80 to 140° C.

The thermal polymerization initiator may be one or two initiators selected from the group consisting of azonitrile-based, azoamide-based, and azoester-based compounds. More specifically, 2,2'-azobis(2,4-dimethylvaleronitrile), AIBN or the like is preferably used, but the scope of the present invention is not limited to the exemplified compounds.

As the compound having two or more isocyanate groups and the acrylate-based functional group introduced thereto, any compound may be used without limitation, as long as it has two or more isocyanate groups, in which the acrylate-based functional group is introduced into any one of isocyanate groups. Any one of isocyanate groups of the isocyanate compound binds with the acrylate-based functional group, and at least one of other isocyanate groups binds with polyol, and thus the isocyanate compound functions as a linker of the acrylate-based functional group and polyol.

The compound having two or more isocyanate groups and the acrylate-based functional group introduced thereto may be prepared by introducing the acrylate-based functional group into the compound having two or more isocyanate groups.

The compound having two or more isocyanate groups is not specifically limited, as long as it has two or more isocyanate groups. Specifically, preferred examples thereof include one or two or more compounds selected from isophorone diisocyanate (IPDI), hexamethylene diisocyanate, methylene bis-(4-cyclohexylisocyanate), trimethyl hexamethylene diisocyanate, toluene-2,4-diisocyanate, and methylene diphenyl-4,4'-diisocyanate, but are not limited thereto.

The method for introducing the acrylate-based functional group into the compound having two or more isocyanate groups may be performed by a method known in the art, for example, by reacting a hydroxy alkyl acrylate-based compound with the compound having two or more isocyanate groups. In particular, the method may be performed by a method comprising the steps of (S41) preparing a solution by adding 1 equivalent weight of the isocyanate-based compound to a non-polar organic solvent at a concentration of 0.2 M to 1 M; (S42) adding 1 to 1.5 equivalent weight of a hydroxy alkyl acrylate-based compound relative to the isocyanate-based compound to the solution prepared in step (S41) at a temperature of 20° C. to 25° C. for 10 to 18 hrs; and (S43) removing the non-polar organic solvent, but the scope of the present invention is not limited thereto.

Preferred examples of the hydroxy alkyl acrylate-based compound include one or two or more compounds selected from hydroxy ethyl(meth)acrylate, hydroxy propyl (meth)acrylate, hydroxy butyl (meth)acrylate, hydroxy-poly(alkyleneoxy)alkyl (meth)acrylate, pentaerythritol hydroxy tri (meth)acrylate, dipentaerythritol hydroxy penta (meth)acrylate, and ditrimethylolpropane hydroxy trimethacrylate, but are not limited thereto.

In the present invention, upon the preparation of the acrylate-based prepolymer, the compound having two or more isocyanate groups and the acrylate-based functional group introduced thereto may be used in an amount of 0.5 to 1 mole equivalent weight, based on the polyol.

Upon the preparation of the acrylate-based prepolymer, a solvent and catalyst may be further used. As a solvent, any solvent known in the art may be used. Examples thereof may include cyclohexanone and methylethylketone toluene (having b.p of 80° C. or higher), but are not limited thereto. As a catalyst, any catalyst known in the art may be also used. Example thereof may include dibutyltin dilaurate (DBTDL).

Upon the preparation of the acrylate-based prepolymer, the polyol, the compound having two or more isocyanate groups and the acrylate-based functional group introduced thereto, and the solvent are preferably used in a ratio of 50 to 70% by weight: 4 to 10% by weight: 25 to 45% by weight. The catalyst is preferably used in an amount of 0.005 to 0.02 parts by weight, based on 100 parts by weight of the compound having two or more isocyanate groups and the acrylate-based functional group introduced thereto.

The UV curable photochromic composition according to the present invention further comprises a photochromic dye. The photochromic dye may be contained in an amount of 1 to 10% by weight, preferably about 2% by weight, based on the total weight of the composition. The solid content of the composition is 60 to 90% by weight, and preferably about 80% by weight.

As the photochromic dye, any one known in the art may be used.

Photochromism is a phenomenon including reversible change of color that is generated by organic or inorganic compounds such as chromene and halogenated silver salts or products containing the same when exposed to UV. Examples of a radiation source containing UV include sunlight or the light of a mercury lamp.

When a photochromic substance is exposed to UV, it exhibits color change. In contrast, the photochromic substance returns to its original color or colorless state, when UV radiation is discontinued. Articles that have photochromic materials applied to or incorporated within the article exhibit this reversible change in color and a consequent reversible change in light transmission.

The mechanism believed to be responsible for the reversible change in color, i.e., the change in the absorption spectrum in the electromagnetic spectrum of visible light (400-700 nm), that is characteristic of different types of organic photochromic compounds has been described.

For example, in John C. Crano, "Chromogenic Materials (Photochromic)", Kirk-Othmer Encyclopedia of Chemical Technology, fourth Edition, 1993, pp. 321-332, it is described that the mechanism responsible for the reversible change in color for organic photochromic compounds (e.g., indolino spiropyrans and indolino spirooxazines) is believed to involve an electrocyclic mechanism. When exposed to activating ultraviolet radiation, these organic photochromic compounds transform from a colorless closed ring form into a colored open ring form.

In contrast, the electrocyclic mechanism responsible for the reversible change in color of photochromic fulgide compounds is believed to involve a transformation from a colorless open ring form into a colored closed ring form.

The UV curable photochromic composition according to the present invention may further comprise an acrylate-based monomer. As the acrylate-based monomer, any one used for the conventional photochromic compositions may be used, without limitation, singly or in a combination of two or more thereof.

The UV curable photochromic composition according to the present invention may further comprise an additive known in the art. Examples thereof may include a durability-improving additive such as HALS series and a surfactant.

The UV curable photochromic composition according to the present invention is easily cured under mild UV radiation conditions, and thus thermal aging of photochromic dye is not generated, resulting in excellent durability. The conventional UV curable photochromic compositions are cured under UV radiation of 900 mJ/cm$^2$ or more. However, the UV curable photochromic composition according to the present invention can be cured under UV radiation of 900 mJ/cm$^2$ or less, even under UV radiation of 400 mJ/cm$^2$.

In addition, the present invention provides photochromic products formed by using the UV curable photochromic composition. The products may be, but are not limited to, any one that can be formed by using the UV curable photochromic composition. For example, the UV curable photochromic composition may be used for a variety of applications, such as photochromic films, sunglasses, fashion lenses, non-prescription and prescription lenses, sport masks, face shields, and goggles, and may be used for building and automotive windshields.

Further, the present invention provides an acrylate-based prepolymer having a polyol structure, in which an acrylate-based functional group is introduced by using an isocyanate-based compound having two or more isocyanate functional groups as a linker. Furthermore, the present invention provides a method for preparing an acrylate-based prepolymer, comprising the steps of: introducing an acrylate-based functional group into an isocyanate-based compound having two or more isocyanate functional groups; and polymerizing the compound, which has an acrylate-based functional group introduced thereto, with a polyol. A detailed description thereof is as the above-mentioned.

MODE FOR THE INVENTION

Hereinafter, the present invention will be described in detail with reference to Examples of the present invention. Examples of the present invention may be modified in many different forms and should not be construed as being limited to Examples set forth herein. Rather, Examples of the present invention are provided so that this disclosure will be thorough and complete and will fully convey the concept of the present invention to those skilled in the art.

<Preparative Example 1>Preparation of Polyol

Each 9.8% by weight of toluene and n-butylacetate was mixed together at a ratio of 1:1, and added to a reactor. Nitrogen was injected into the reactor, and heated. After the temperature of the substances in the reactor reached to 80° C., 95.96% by weight of a monomer mixture of hydroxy propyl methacrylate and butylacrylate in a weight ratio of 1:1 and a mixture of 1.39% by weight of thermal polymerization initiator, V-65 (trade name) diluted in 13.06% by weight of n-butylacetate were slowly added thereto for 2 hrs. Subsequently, the mixture was stirred for 1 hr, and reacted with each other to prepare polyol.

<Preparative Example 2>Preparation of Reactive Isocyanate 97.81 g (440 mmol) of isophorone diisocyanate was added to n-hexane (880 mL), and 68.72 g (528 mmol) of hydroxy ethyl methacrylate (HEMA) was slowly added thereto at room temperature for 20 hrs. Subsequently, the solvent was distilled under reduced pressure and removed therefrom to prepare reactive isocyanate.

<Preparative Example 3>Preparation of Acrylate Prepolymer 340 g of polyol (60% by weight, —OH value: 1,700) prepared in Preparative Example 1 was mixed with 35 g (7% by weight) of reactive isocyanate prepared in Preparative Example 2 at an equivalent weight ratio of 1:1. The mixture and 0.01 part by weight of dibutyltin dilaurate (DBTDL) based on 100 parts by weight of the reactive isocyanate were added to 200 g (35% by weight) of cyclohexanone, and stirred at 80° C. for 3 hrs to polymerize urethane, resulting in an acrylate-based prepolymer having a weight average molecular weight of 6,000.

<Example 1 and Comparative Example 1>

The UV curable photochromic coating composition (Composition Examples 1 and 2) was prepared according to the composition as shown in the following Table 1. In Composition Example 1, the compound prepared in the same manners as in the above described Experimental Example was used as the acrylate-based prepolymer, and in Composition Example 2, the acrylate-based prepolymer was not used, and the acrylate monomer was only used.

TABLE 1

| Section | Composition Example 1 | | Composition Example 2 | |
|---|---|---|---|---|
| | Material | Content (g) | Material | Content (g) |
| Solvent | Cyclohexanone | 15.00 | Cyclohexanone | 20.00 |
| | | | Ethylene acetate | 15.00 |
| | | | Methanol | 15.00 |
| Surfactant | Tego 270 | 0.50 | Tego 270 | 0.45 |
| | Tego 410 | 0.50 | Tego 410 | 0.45 |
| | Tego 450 | 0.50 | Tego 450 | 0.45 |
| Photochromic dye | Flame (James Robinson Co.) | 2.30 | Flame (James Robinson Co.) | 1.90 |
| Curing initiator | Irg 184 | 1.20 | D 1173 | 0.80 |
| | Irg 819 | 1.20 | Irg 184 | 0.80 |
| | — | — | Irg 819 | 0.80 |
| Acrylate monomer | BP4PA | 38.00 | DPHA | 18.00 |
| | 9 EGDA | 12.00 | DVB | 3.00 |
| | DVB | 4.00 | EB1290 | 4.00 |
| | DPHA | 5.00 | EB600 | 20.00 |
| Acrylate prepolymer | HPA 01 | 20.00 | — | — |

In Table 1, the substance is, represented by Tego, a surfactant, polyether siloxane copolymer provided by Tego Inc. and the following number represents a product identification number. Irg 184 represents 1-hydroxy-cyclohexyl-phenyl ketone. Irg 819 represents bis(2,4,6-trimethylbenzoyl)-phenylphosphineoxide. D1173 represents 2-hydroxy-2-methyl-1-phenyl-propan-1-one. BP4PA represents bisphenol A propyl diacrylate. 9-EGDA represents 9-ethyleneglycol diacrylate. EHA represents ethyl hexyl acrylate. DVB represents divinyl benzene. DPHA represents dipentaerythritol hexa acrylate. HPA is hydroxylated polyacrylate, and represents the acrylate prepolymer prepared in Preparative Examples 1 to 3. EB 1290 and EB600 are the trade name of acrylate oligomer, manufactured by SK-cytec Co., Ltd.

With respect to Composition Example 1 according to Table 1, the curing reaction was performed according to the UV curing condition of Examples 1 to 3 in the following Table 2. With respect to Composition Example 2, the curing reaction was performed according to the UV curing condition of Comparative Examples 1 to 4 in the following Table 2.

TABLE 2

| Section | UV curing condition (mJ/cm$^2$) |
|---|---|
| Example 1 | 400 |
| Comparative Example 1 | 400 |
| Example 2 | 500 |
| Comparative Example 2 | 500 |
| Example 3 | 600 |
| Comparative Example 3 | 600 |
| Comparative Example 4 | 900 |

Degree of surface hardness and transmittance of the final resultants according to Tables 1 and 2 were measured, and shown in the following Table 3.

Degree of surface hardness is, one of evaluation items, determined by observation of the surface of cured photochromic film with the naked eye, and its surface gloss and adhesion were evaluated as good or bad.

Transmittance was, the other of evaluation items, determined by measuring changes in transmittance of the cured photochromic film, and the value varies depending on matrix hardness of resin and strength of ultraviolet radiation. Initial transmittance of the film was regarded as 100%, and the relative value of its transmittance after UV radiation was determined.

TABLE 3

| Section | Degree of surface hardness | Δ Transmittance (%) |
|---|---|---|
| Example 1 | Good | 60 |
| Comparative Example 1 | Bad | 40 |
| Example 2 | Good | 80 |
| Comparative Example 2 | Bad | 40 |
| Example 3 | Good | 70 |
| Comparative Example 3 | Bad | 40 |
| Comparative Example 4 | Good | 40 |

As shown in Table 3, the films in Examples according to the present invention were evaluated as good in degree of surface hardness, and their transmittance was determined as 50% or more, whereas the films in Comparative Examples 1 to 3 did not exhibit suitable characteristics in terms of degree of surface hardness and transmittance, compared to those in Examples. The film in Comparative Example 4, which was cured under strong UV curing condition, was evaluated as good in degree of surface hardness, but did not exhibit suitable characteristic in terms of transmittance, compared to those in Examples.

According to the present invention, even though curing reaction is performed under milder UV radiation conditions, the desired curing can be achieved. Thus, reduction in the optical density and durability of photochromic dye generated under the conventional strong curing conditions can be prevented and process efficiency can be improved.

<Example 2>

The experiment was performed in the same manners as in Example 1, except using HPA 02 of the following composition as the acrylate-based prepolymer.

TABLE 4

| | HPA 02 | | |
|---|---|---|---|
| Section | Compound | Percentage | equiv ratio |
| Polyol | *Polyol having a hydroxy value of 340 | 34.00 | 35.61 | 1.00 |
| Isocianate compound | HEMA-IPDI | 26.43 | 27.68 | 0.75 |
| Solvent | Cyclohexanone | 35.00 | 36.66 | |
| Catalyst | DBTDL | 0.05 | 0.05 | |
| | Total weight (g) | 95.48 | 100.00 | |
| | Solid content (wt %) | 0.63 | 0.63 | |

*Polyol having a hydroxy value of 340: prepared in the same manners as in Preparative Example 1, except controlling the content of hydroxy propyl methacrylate.

In the case of using HPA 02, the UV energy needed for curing was 800 mJ/cm², and its degree of surface hardness was evaluated as good, and durability was QUV 100 hrs.

<Example 3>

The experiment was performed in the same manners as in Example 1, except using HPA 03 of the following composition as the acrylate-based prepolymer.

TABLE 5

| | HPA 03 | | |
|---|---|---|---|
| Section | Compound | Percentage | equiv ratio |
| Polyol | **Polyol having a hydroxy value of 3000 | 500.00 | 76.30 | 1.00 |
| Isocianate compound | HEMA-IPDI | 35.24 | 5.38 | 1.00 |
| Solvent | Cyclohexanone | 120.00 | 18.31 | |
| Catalyst | DBTDL | 0.06 | 0.01 | |
| | Total weight (g) | 655.31 | 100.00 | |
| | Solid content (wt %) | 0.82 | 0.82 | |

**Polyol having a hydroxy value of 3000: prepared in the same manners as in Preparative Example 1, except controlling the content of hydroxy propyl methacrylate.

In the case of using HPA 03, the UV energy needed for curing was 400 mJ/cm², and its degree of surface hardness was evaluated as good, and durability was QUV 50 hrs.

The preferred Examples of the present invention were disclosed as described above. However, specific terms used in these Examples are for illustrative purposes only, and the scope of the present invention is not intended to be limited by these Examples.

The invention claimed is:

1. A UV curable photochromic composition comprising a photochromic dye and an acrylate-based prepolymer having a polyol structure in which an acrylate-based functional group is introduced by using an isocyanate-based compound having two or more isocyanate functional groups as a linker,
wherein the acrylate-based prepolymer comprises a unit of the following Formula 1:

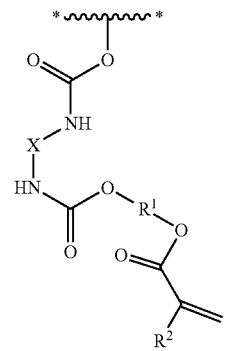

[Formula 1]

wherein
〰 is a main chain of polyol,
X is a main domain of a compound having two or more isocyanate groups,
$R^1$ is a direct bond or alkylene group, and
$R^2$ is hydrogen or alkyl group.

2. The UV curable photochromic composition according to claim 1, wherein the acrylate-based prepolymer has a weight average molecular weight of 2,000 or more.

3. The UV curable photochromic composition according to claim 1, wherein the acrylate-based prepolymer is prepared by polymerizing polyol with the compound which has two or more isocyanate groups and the acrylate-based functional group introduced thereto.

4. The UV curable photochromic composition according to claim 3, wherein the polyol has a hydroxy value of 200 to 2,000.

5. The UV curable photochromic composition according to claim 3, wherein the polyol has a weight average molecular weight of 1,000 to 2,000.

6. The UV curable photochromic composition according to claim 3, wherein the polyol is a substance obtained by a method comprising the steps of:
(S21) injecting a mixture of toluene and n-butylacetate in a weight ratio of 1:1 into a reactor;
(S22) heating while injecting nitrogen ($N_2$) into the reactor;
(S23) diluting 50 to 70% by weight of a monomer mixture of hydroxy propyl methacrylate and butylacrylate in a weight ratio of 5:1 to 1:5 and 0.5 to 3% by weight of a thermal polymerization initiator in 50 to 30% by weight of toluene, and adding the resultant to the reactor; and
(S24) stirring the resultant in the reactor for 1 to 5 hrs.

7. The UV curable photochromic composition according to claim 3, wherein the compound having two or more isocyanate groups and the acrylate-based functional group introduced thereto is prepared by reacting a hydroxy alkyl acrylate-based compound with the compound having two or more isocyanate groups.

8. The UV curable photochromic composition according to claim 7, wherein the compound having two or more isocyanate groups includes one or more selected from isophorone diisocyanate (IPDI), hexamethylene diisocyanate, methylene bis-(4-cyclohexylisocyanate), trimethyl hexamethylene diisocyanate, toluene-2,4-diisocyanate, and methylene diphenyl-4,4'-diisocyanate.

9. The UV curable photochromic composition according to claim 7, wherein the compound having two or more isocyanate groups and the acrylate-based functional group introduced thereto is prepared by a method comprising the steps of:

(S41) preparing a solution by adding 1 equivalent weight of the isocyanate-based compound to a non-polar organic solvent at a concentration of 0.2 M to 1 M;

(S42) adding 1 to 1.5 equivalent weight of a hydroxy alkyl acrylate-based compound (relative to the isocyanate-based compound) to the solution prepared in step (S41) at a temperature of 20° C. to 25° C. for 10 to 18 hrs; and (S43) removing the non-polar organic solvent.

10. The UV curable photochromic composition according to claim 7, wherein the hydroxy alkyl acrylate-based compound comprises one or more selected from hydroxy ethyl (meth)acrylate, hydroxy propyl (meth)acrylate, hydroxy butyl (meth)acrylate, hydroxy-poly(alkyleneoxy)alkyl (meth)acrylate, pentaerythritol hydroxy tri(meth)acrylate, dipentaerythritol hydroxy penta (meth)acrylate, and ditrimethylolpropane hydroxy trimethacrylate.

11. The UV curable photochromic composition according to claim 3, wherein the compound having two or more isocyanate groups and the acrylate-based functional group introduced thereto is used in an amount of 0.5 to 1 mol equivalent weight, based on the polyol.

12. The UV curable photochromic composition according to claim 3, wherein a solvent and a catalyst are further used upon the preparation of the acrylate-based prepolymer.

13. The UV curable photochromic composition according to claim 1, further comprising an acrylate-based monomer.

14. Photochromic products formed by using the UV curable photochromic composition according to claim 1.

* * * * *